United States Patent [19]
Bornstein

[11] Patent Number: 5,668,344
[45] Date of Patent: Sep. 16, 1997

[54] BALLISTIC PANEL

[76] Inventor: Avraham Bornstein, Arbel Street 8/2, Kfar Saba, Israel

[21] Appl. No.: 378,050

[22] Filed: Jan. 24, 1995

[30] Foreign Application Priority Data

Jan. 25, 1994 [IL] Israel ............................................ 108434

[51] Int. Cl.⁶ ................................. B32B 5/04; F41H 5/04
[52] U.S. Cl. ........................... 89/36.02; 89/36.05; 428/911
[58] Field of Search ............................ 2/2.5; 89/36.02, 89/36.05; 109/49.5, 80; 428/911

[56] References Cited

U.S. PATENT DOCUMENTS 5,061,545 10/1991 Li et al. .................................. 428/911

FOREIGN PATENT DOCUMENTS

| 1082585 | 7/1980 | Canada | 2/2.5 |
| 1199137 | 12/1959 | France | 89/36.02 |
| 3537093 | 4/1987 | Germany | 89/36.02 |

*Primary Examiner*—Michael J. Carone
*Attorney, Agent, or Firm*—Townsend and Townsend and Crew LLP

[57] ABSTRACT

A substantially rigid ballistic panel made of a composite material consisting of fibers embedded in a resin, characterized in that, with regard to mechanical properties across the surface of the panel, the panel is inhomogeneous.

8 Claims, 1 Drawing Sheet

BALLISTIC PANEL

The present invention relates to ballistic panels made composite material and exhibiting enhanced protective qualities in comparison to known ballistic panels made of similar materials and of similar weight.

Regardless of the material of which prior art flexible or rigid panels were made, they all had a common property: they were homogeneous, i.e., the mechanical properties of such a panel were substantially uniform throughout and over all points of the panel. While conventional wisdom would assume such panels to have optimum protective properties, it was surprisingly found that panels with "built-in" inhomogeneities concerning hardness, elongation and mechanical strength offered better protection in that impacting projectiles tend to be deflected towards the weaker or softer structural elements, thus turning a perpendicular impact into a far less damaging, slanting one.

It is thus the object of the present invention to provide a ballistic panel of an inhomogeneous structure that will substantially enhance the protective capabilities of such panels and reduce the trauma effect.

According to the invention, this object is achieved by providing a substantially rigid ballistic panel made of a composite material consisting of fibers embedded in at least one type of resin, characterized in that, with regard to mechanical properties across at least the surface of the panel, said panel is inhomogeneous.

The invention further provides a substantially flexible, multilayer ballistic panel made of woven textile threads, characterized in that, with regard to mechanical properties, said panel is inhomogeneous.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
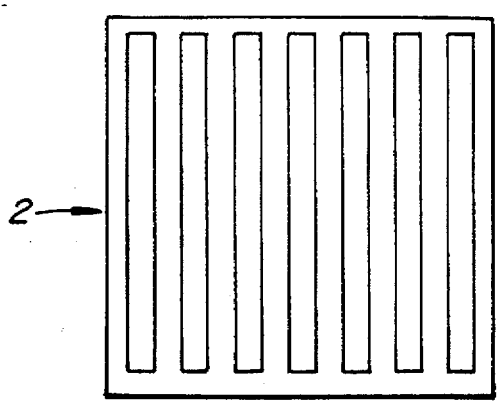
FIGS. 1–4 illustrate various configurations of the structural inhomogeneities in the panels according to the invention.
Figure 2:
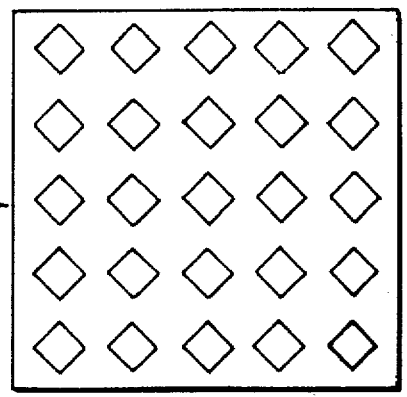
Figure 3:
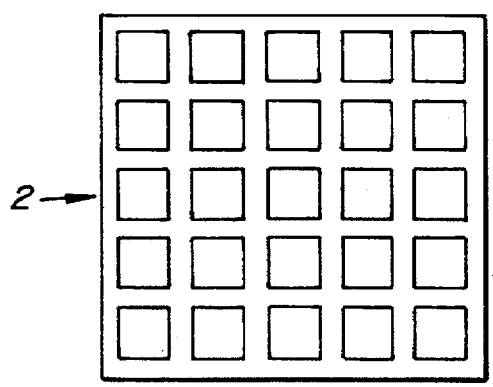

Referring now to the drawings, there are seen in FIGS. 1–4 several configurations of the above-mentioned structural elements rendering ballistic panels inhomogeneous, a quality that, as explained, was found to enhance the protective properties of these panels by deflecting an impacting projectile towards the weaker or softer structural elements and thus turning even a perpendicular impact into a far less damaging, slanting one.

The panels 2 are made of a plurality of layers of a composite consisting of a resin matrix (phenols, polyester, epoxy, polymethane, etc.) in which, in a per se known manner, are embedded synthetic fibers (KEVLAR, Nylon, polyester, etc.), not shown.

In one of the embodiments of the panel 2, inhomogeneity, irrespective of the particular shapes as represented by way of example only in FIGS. 1–4, is achieved by using two separate resins having different mechanical properties such as hardness and elongation. Thus, the rectangular matrix regions in FIG. 1, the square regions in FIGS. 2 and 3, and the circular regions in FIG. 4 consist of, e.g., a high-strength resin 4, and the matrix regions surrounding these shapes consist of a resin 6 of lower mechanical properties, or vice-versa. An example of the dimensions and relative positions of these regions is given in FIG. 4, with A and B being of an order of magnitude of 15 mm and C, of 8 mm.

Figure 4:
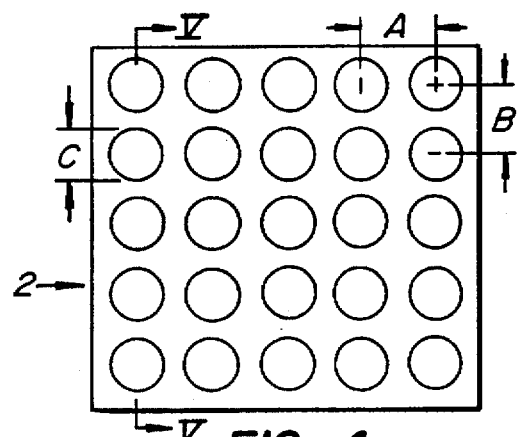
Figure 5:
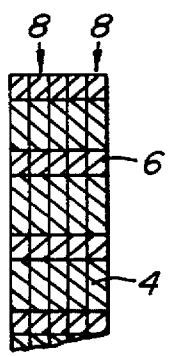
FIG. 5 is a view, in cross-section along plane V—V, of the panel of FIG. 4.

FIG. 5 is a schematic cross-section of the panel 2 along plane V—V in FIG. 4, in which the vertical lines indicate the boundaries of the layers 8 and the horizontal lines denote the boundaries of the different resins 4 and 6. For reasons of clarity, the fibers are not shown and the shading for each particular resin is unidirectional. The number of layers 8 depends on the type of projectile the panel is meant to stop.

While in the panels of FIGS. 1–4 the above-discussed deflection effect was obtained by producing inhomogeneities resulting from the use in adjacent regions of resins of different mechanical properties, a similar effect is also obtainable by the use of a single resin only, and varying in adjacent regions the weight percentage (wt. %) of that resin, weight percentage being, in this case, the percentage of resin in the total weight of the composite panel (including resin and fibers).

Figure 6:
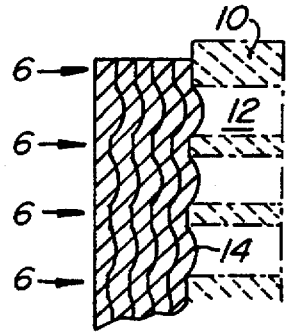
FIGS. 6 and 7 are views, in cross-section along plane V—V, of two different modifications of the panel configuration of FIG. 4, showing also the pressure plates used to produce these modifications.

To achieve this type of inhomogeneity, the panel 2 of, say, FIG. 4, is subjected in its precured state to pressure by a plate 10 having a plurality of perforations 12 of a diameter, e.g., C and mutual distances, e.g., A and B, as in FIG. 4. As a result of such pressure, the regions 6 of the layered panel 2 are compressed, with some of the material flowing into the perforations and producing the knobbly, "blistered" surface of the cross-sectional view of FIG. 6, with the surface projections 14 having a height of about 0.8 mm. Clearly, the panel "columns" produced by the stack of "nested" projections of the plurality of panel layers and aligned with the perforations 12, have a higher wt. % than the regions 6 that were subjected to pressure, being about 18%, while the wt. % of the projection 14 is about 22%. It is also seen that the "blister"-raising effect of the pressure decreases with increasing depth, which reduces the brittleness of the lower layers, a desirable situation that enhances the protective properties of the panel. As an additional "bonus," the fibers inside the projections 14 are less prestressed in tension and are thus capable of absorbing larger amounts of energy before failing.

Figure 7:
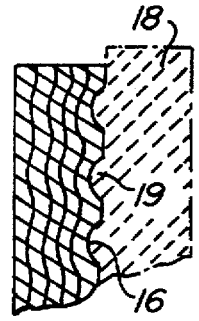

FIG. 7 schematically represents a panel in which the inhomogeneities are the result of a pattern of dimples 16 embossed in the panel by means of a pressure plate 18 with projections 19. In this case, the panel "columns" defined by the diameter of the surface dimples 16 have a lower wt. % than the regions 6, which were not subjected to pressure. In analogy to the panel of FIG. 6, the effect of the embossing decreases with increasing depth. The fibers in the dimpled regions, on the other hand, are more stressed in tension than the fibers in the raised resions of FIG. 6.

Panels with "blistered" or "dimpled" surfaces can, of course, be produced also with other configurations of surface patterns.

Also known are multi-layer, flexible ballistic panels made of woven textiles. In analogy to the above-discussed panels made of composites, the protective properties of these textile panels can equally be improved by rendering their structure inhomogeneous.

Figure 8:
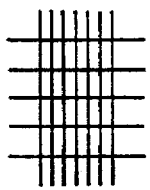
FIGS. 8–10 are schematic representations of sections of single layers of ballistic panels made of woven textile fabrics.

In the panel layer detail of FIG. 8, for instance, the number of warp threads 20 per unit length is much larger than that of the weft threads 22.

Figure 9:
Figure 10:

In FIG. 9, the denier number of adjacent warp and/or weft threads 24 gradually decreases in a periodically recurrent pattern or sequence, while in FIG. 10 the adjacent warp and/or weft threads 26 to 34, although of the same denier, are of a mechanical strength that gradually decreases in a periodically recurrent pattern or sequence, thread 36 restarting the pattern, being of the same strength as thread 26.

Obviously, these panels can all be turned into composites by impregnating their basic layers or basic warp or weft configurations with one of the resins.

Also, the invention can just as well be realized utilizing mono-directional threads or fibers.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A substantially rigid ballistic panel made of a composite material consisting of fibers embedded in at least one type of resin, characterized in that, with regard to mechanical properties across at least the surface of the panel, said panel is inhomogeneous, wherein the panel defines a plurality of layers with each layer defining a plurality of columns extending across the thickness of the panel, the material having a substantially equivalent weight percentage within each column; wherein each column is aligned with columns in adjacent layers.

2. The ballistic panel as claimed in claim 1, wherein said panel is inhomogeneous also with regard to its thickness.

3. The ballistic panel as claimed in claim 1, wherein inhomogeneity is produced by providing said panel with a selected pattern of adjacent regions comprised of at least two types of resins with differing mechanical properties.

4. The ballistic panel as claimed in claim 1, wherein inhomogeneity is produced by providing said panel with a selected pattern of regions with differing weight percentages of one and the same resin.

5. The ballistic panel as claimed in claim 4, wherein said differing weight percentages of said resin are produced by providing at least the surface of said panel with a preselected, three-dimensional pattern.

6. The ballistic panel as claimed in claim 5, wherein said three-dimensional pattern of said surface consists of projections or recesses.

7. The ballistic panel as claimed in claim 1, wherein inhomogeneity is produced by non-uniformly prestressing at least some of said fibers in tension.

8. A substantially rigid ballistic panel made of a composite material consisting of fibers embedded in at least one type of resin, characterized in that, with regard to mechanical properties across at least the surface of the panel, said panel is inhomogeneous, wherein the panel defines a plurality of layers with each layer defining a plurality of columns extending across the thickness of the panel, wherein each column is aligned with columns in adjacent layers and the material within alternating columns of the panel has different weight percentages.

* * * * *